Oct. 15, 1935.  E. F. MUELLER  2,017,286
DRIER
Original Filed May 16, 1933   3 Sheets-Sheet 1
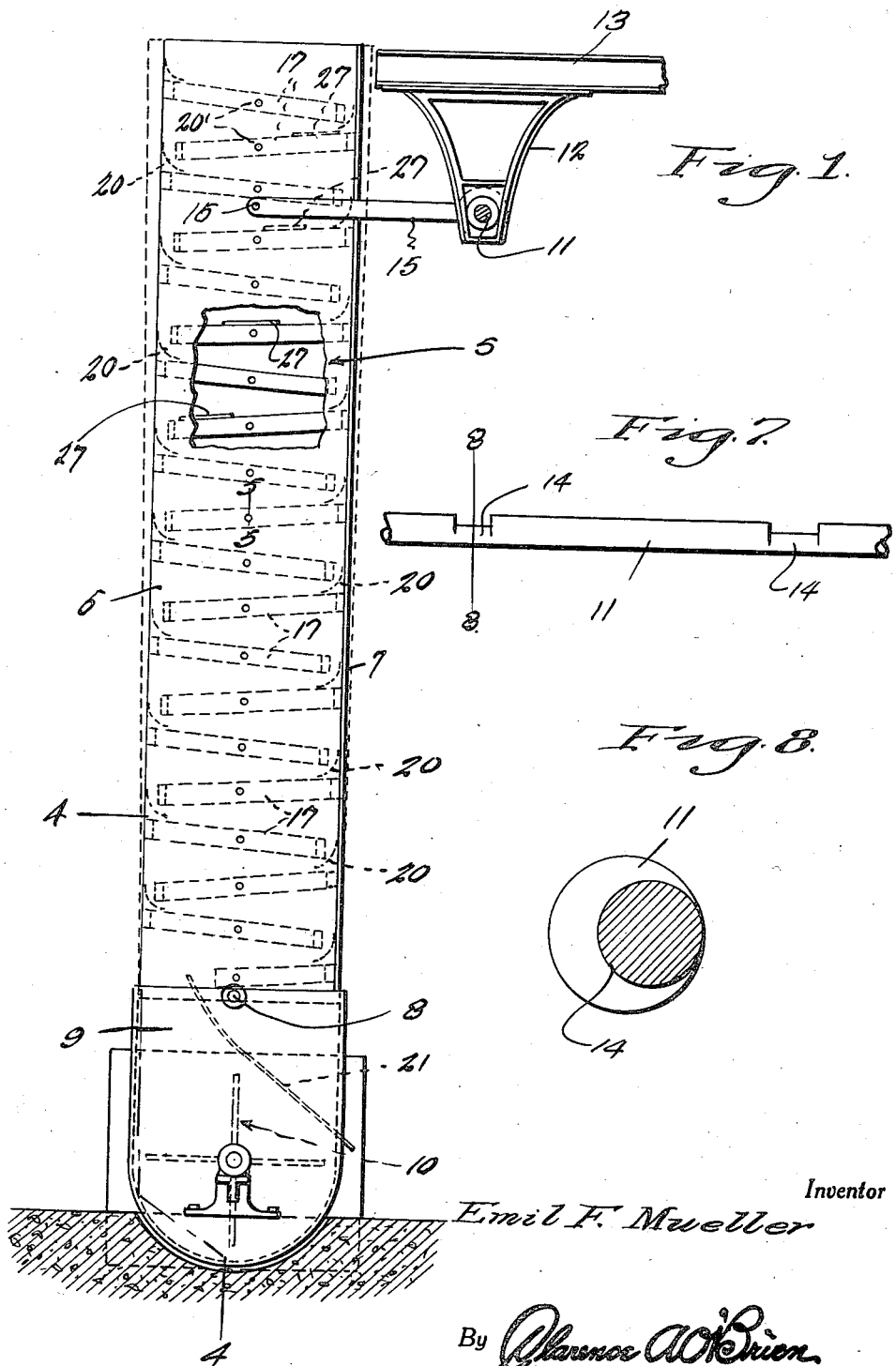
Inventor
Emil F. Mueller
By Clarence A. O'Brien
Attorney Oct. 15, 1935.  E. F. MUELLER  2,017,286
DRIER
Original Filed May 16, 1933   3 Sheets-Sheet 2
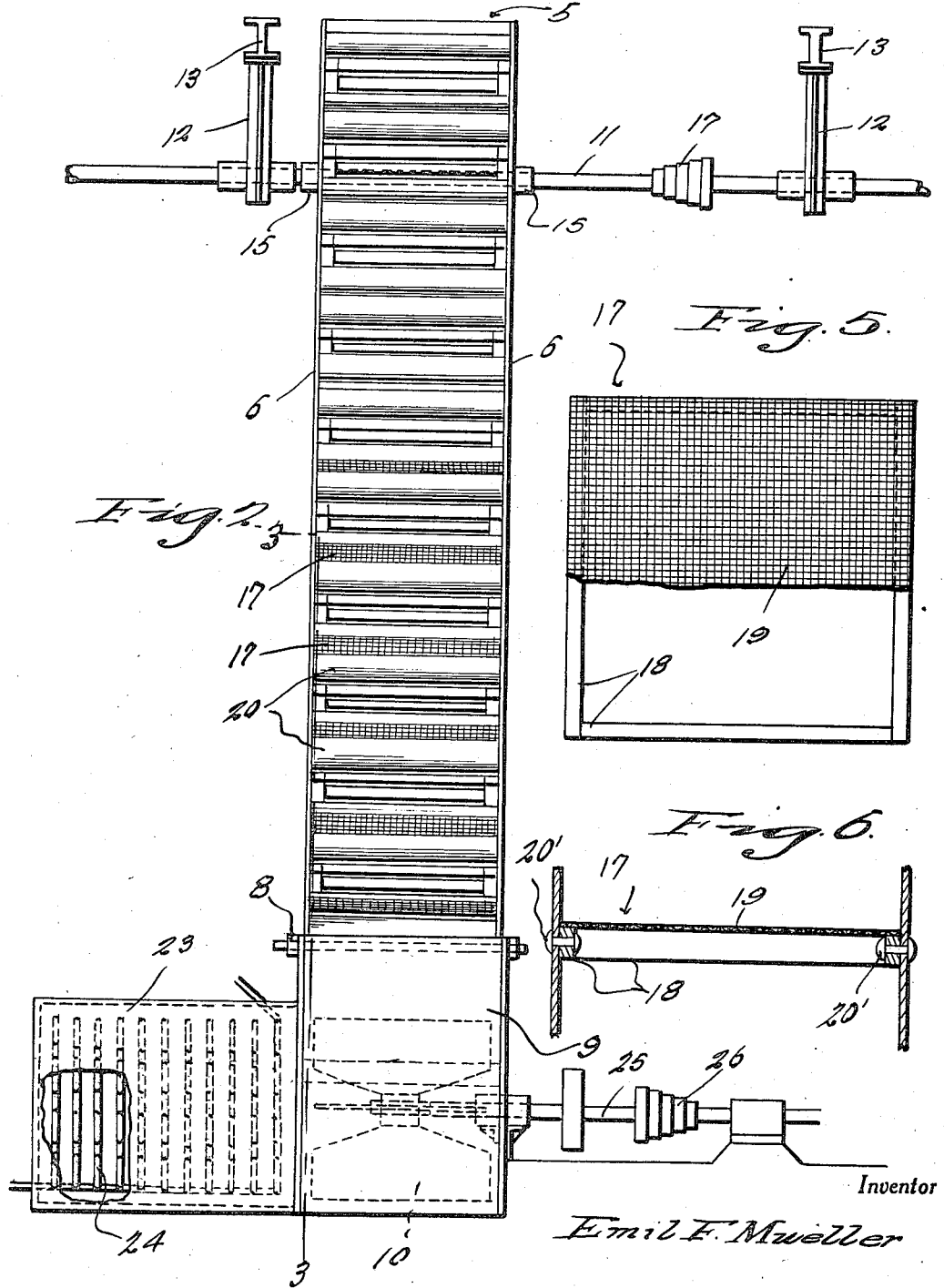
Inventor
Emil F. Mueller
By Clarence A. O'Brien
Attorney Oct. 15, 1935.  E. F. MUELLER  2,017,286
DRIER
Original Filed May 16, 1933  3 Sheets-Sheet 3
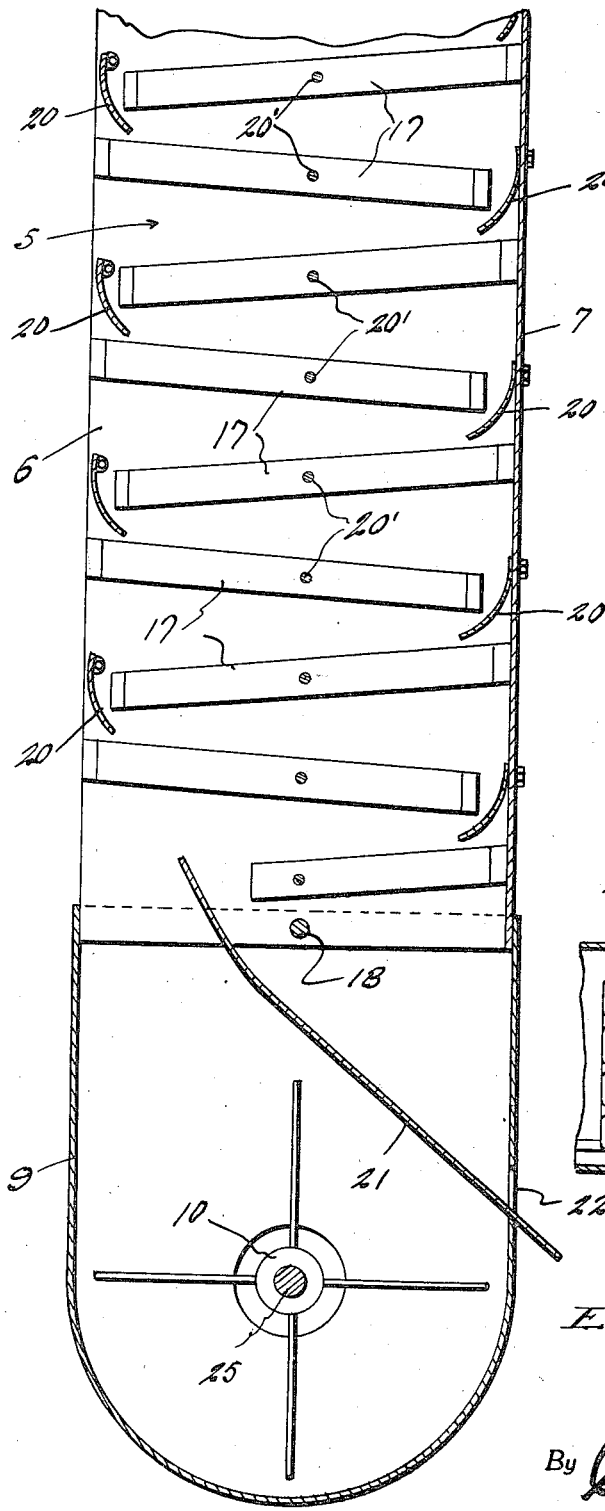
Inventor
Emil F. Mueller
By Clarence A. O'Brien
Attorney Patented Oct. 15, 1935

2,017,286

UNITED STATES PATENT OFFICE 2,017,286

DRIER

Emil F. Mueller, Arpin, Wis.

Application May 16, 1933, Serial No. 671,412
Renewed March 16, 1935

1 Claim. (Cl. 34—38)

This invention relates to driers and has as its primary object the provision of a drier especially adapted for drying casein, although, as will be apparent to those skilled in the art, the drier can be used for drying other materials.

In accordance with the present invention a drier is provided having a chamber pivoted to swing vertically for imparting a shaking action to a plurality of oppositely inclined screens mounted therein and through which the particles of the material to be dried pass successively to an outlet chute at the bottom of the chamber; and the invention, together with its numerous objects and advantages, will be best understood from a study of the following description taken in connection with the accompanying drawings wherein:

Figure 1 is a side elevational view of the device.

Figure 2 is a front elevational view thereof.

Figure 3 is a longitudinal sectional view taken substantially on the line 3—3 of Figure 2.

Figure 4 is a vertical sectional view taken substantially on the line 4—4 of Figure 1.

Figure 5 is a plan view of a screen with a portion of the reticulated material removed.

Figure 6 is a transverse sectional view showing the manner of pivotally mounting a screen within the chamber.

Figure 7 is a plan view of a portion of a crank shaft.

Figure 8 is a transverse sectional view therethrough taken on the line 8—8 of Figure 7.

Referring to the drawings by reference numerals, it will be seen that 5 indicates generally a drying chamber, the same including a pair of side walls 6 and an end wall 7 connecting the side walls, the chamber being opened at the front, and also at the top and bottom thereof. At the bottom of the chamber, the side walls 6 thereof are pivotally connected as at 8 with the side walls of a blower casing 9 that has suitably mounted therein a fan 10.

For shaking the chamber 5, that is for swinging the same back and forth on its pivot 8, there is provided a crank shaft 11 suitably journaled in bearings provided in hanger brackets 12 suspended from suitable supports, as for example, in the present instance, rails 13. At spaced intervals thereon the crank shaft 11 is reduced in a manner clear from a study of Figures 7 and 8 to provide eccentrics or crank portions 14 with which are connected connecting rods 15 that are also pivoted to the sides 6 of the chamber adjacent the upper ends of the sides as at 16. Shaft 11 is also provided with a cone pulley 17 whereby provision is made for driving the shaft from a suitable driving means, such as a prime mover at the desired rate of speed.

Swingably mounted in the chamber 5 between the side walls 6 is a vertical series of spaced oppositely inclined screens 17 and each of these screens, as will be clear from a study of Figures 5 and 6, comprises a rectangular frame 18 having secured thereto a sheet of reticulated material 19. Opposite side members of the respective frames are pivoted to the walls 6 as at 20', and said side members of the frame have frictional contact with the wall in a manner to frictionally retain the screen at the desired angular adjustment. Normally the screens are arranged as shown to provide a tortuous passage of the material downwardly through the chamber 5.

Arranged relative to the screens 17 in a manner thought to be clear from a study of Figure 1 are transversely curved baffles 20 which serve to direct the material discharging from the lower end of an uppermost screen onto the next adjacent lower screen at the raised end of the latter screen.

Arranged in operative position to the lower or discharge end of the lowermost screen 17 is a discharge chute 21 that is extended through a discharge opening 22 provided in one wall of the fan casing 9 as will be clear from a study of Figure 3.

Connected with the air inlet side of the fan casing 9 is a heating chamber 23 in which is provided a coil 24 for the circulation of a heating medium so that obviously as the air is drawn into the casing 9 through the chamber 23, the air is heated, and the heated air passes upwardly through the heating chamber for drying the casein or other material passing downwardly through the drying chamber 5.

For driving the fan 10 there is provided a shaft 23 that is also equipped with a suitable cone pulley 24 so that this shaft may be driven at different speeds.

As will be noted from a consideration of Figure 1, the shaking action on the chamber 5 will be greater at the upper end and gradually decreases downwardly. To retard the passage of the smaller particles of the casein or other material being dried at the upper portion of the chamber 5 there are provided on several of the alternate screens 17 imperforate relatively small plates 27 and the plates are staggered as shown in Figure 1 so as not to completely shut off the flow of air upwardly through the screens, yet, at the same time, keep the relatively fine particles of the material from falling completely through the screen without having a chance to dry.

The operation of the device is thought apparent. The material to be dried is fed to the chamber 5 at the top thereof onto the uppermost screen, and is subjected to a thorough shaking action, the chamber 5 being continuously vibrated during the drying operation. The small particles of the material will, of course, pass downwardly through the meshes of the reticulated material 19 from one screen to the other while the larger particles will drop from the lowermost ends of the screens onto the next succeeding lower screen thereby caused to take a tortuous path downwardly through the chamber causing a relatively slow movement of the material through the chamber and thereby insuring a thorough drying of the material. The smaller particles, as before stated, will be impeded in their downward progress to a considerable extent at the upper portion of the chamber through the medium of the plate 27 to also insure a thorough drying of such particles. From the lowermost screen the dried particles discharge onto the chute 21 through the medium of which they are directed outwardly of the casing 9 into a suitable receptacle or the like. Further, during the drying action air will be drawn inwardly through the chamber 23, and the heated air passing out of the chamber 23 into the casing 9 will of course ascend into the chamber 5 for drying the particles of the material as the material passes downwardly through the chamber.

In actual practice, a drier of this character will be found especially efficient for drying "rennet" casein, a type of casein extremely difficult to properly dry; and it is also to be understood that while the device has been described as a drier for casein, other suitable materials can also be dried in a thoroughly practical and efficient manner in a device of this character.

What is claimed is:

A drier of the class described comprising a blower casing open at its top and having a heating chamber extending laterally from one side thereof, means arranged in the heating chamber for circulating a heating medium therethrough, a blower fan mounted in the blower casing for drawing heated air through the blower casing and upwardly through the top thereof, a drying chamber pivotally mounted at its lower end on the blower casing, said drying chamber being open at the front, top and bottom thereof, a plurality of inclined screens arranged in the drying chamber to provide a tortuous passage for the material, alternate screens having imperforate plates extending transversely thereof at one end to retard the downward passage of such of the material as falls on said imperforate plates in the downward passage of the material through the drying chamber, and an inclined discharge chute mounted in the blower casing and having one end extending upwardly through the bottom of the drying chamber, and a lower end extending through an opening in one wall of the blower casing.

EMIL F. MUELLER.